Jan. 4, 1938.   G. A. MATTHEWS   2,104,131
ALTERNATING CURRENT SYSTEM OF DISTRIBUTION
Filed Sept. 25, 1933   3 Sheets-Sheet 1
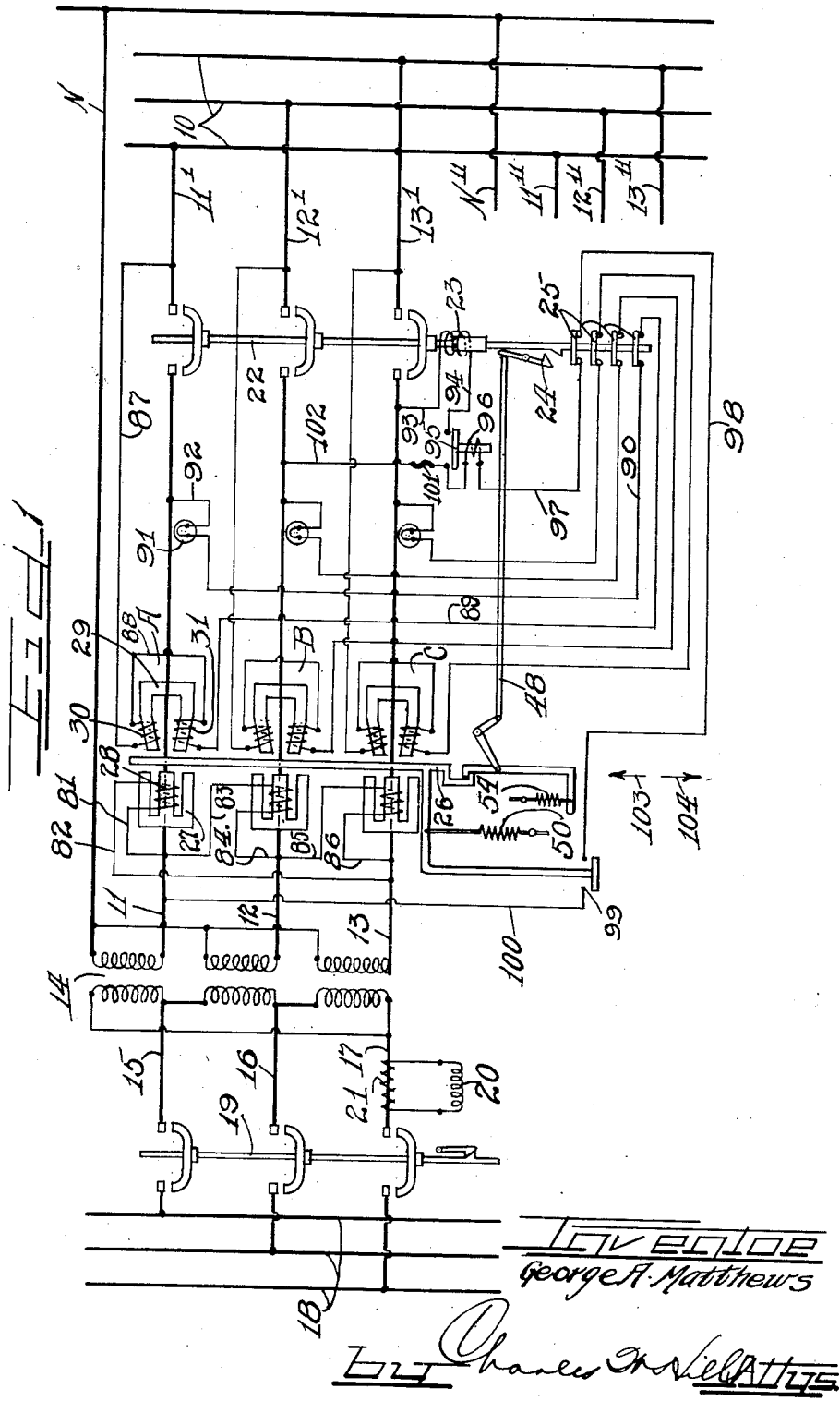

Jan. 4, 1938.  G. A. MATTHEWS  2,104,131
ALTERNATING CURRENT SYSTEM OF DISTRIBUTION
Filed Sept. 25, 1933  3 Sheets-Sheet 2
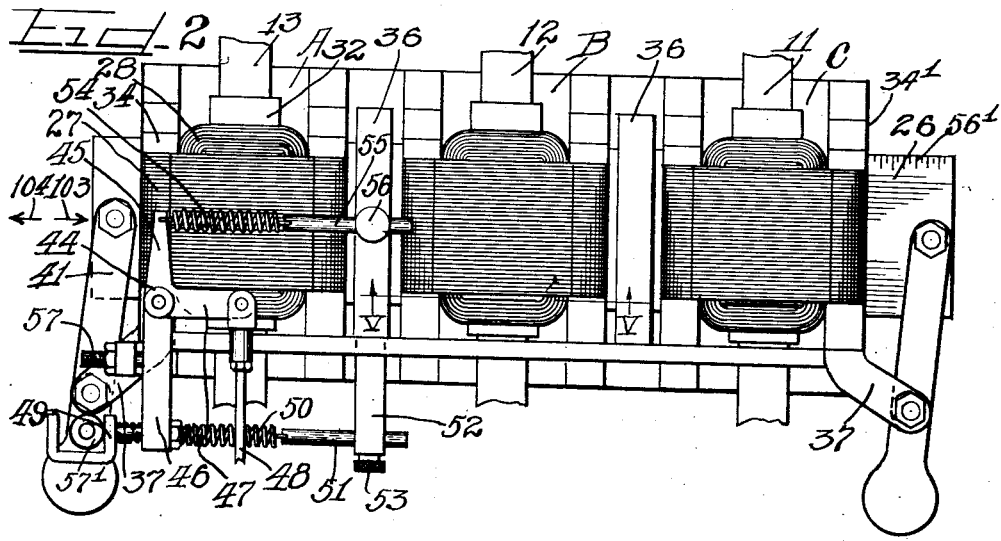
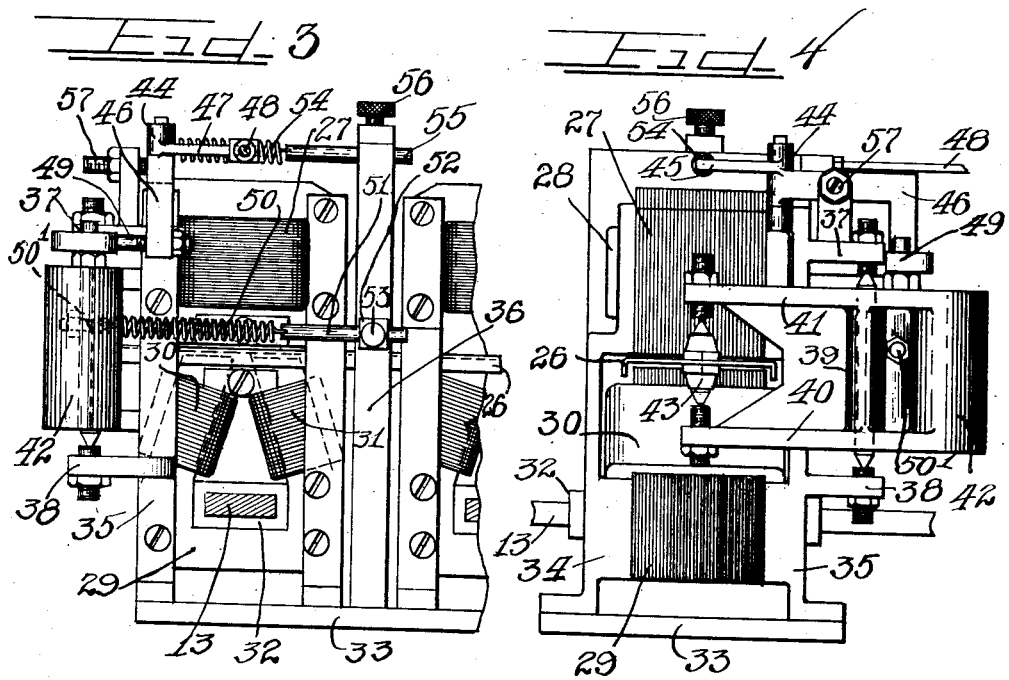
Inventor
George A. Matthews
By Charles Orr Light
Atty.

Jan. 4, 1938. G. A. MATTHEWS 2,104,131
ALTERNATING CURRENT SYSTEM OF DISTRIBUTION
Filed Sept. 25, 1933 3 Sheets-Sheet 3
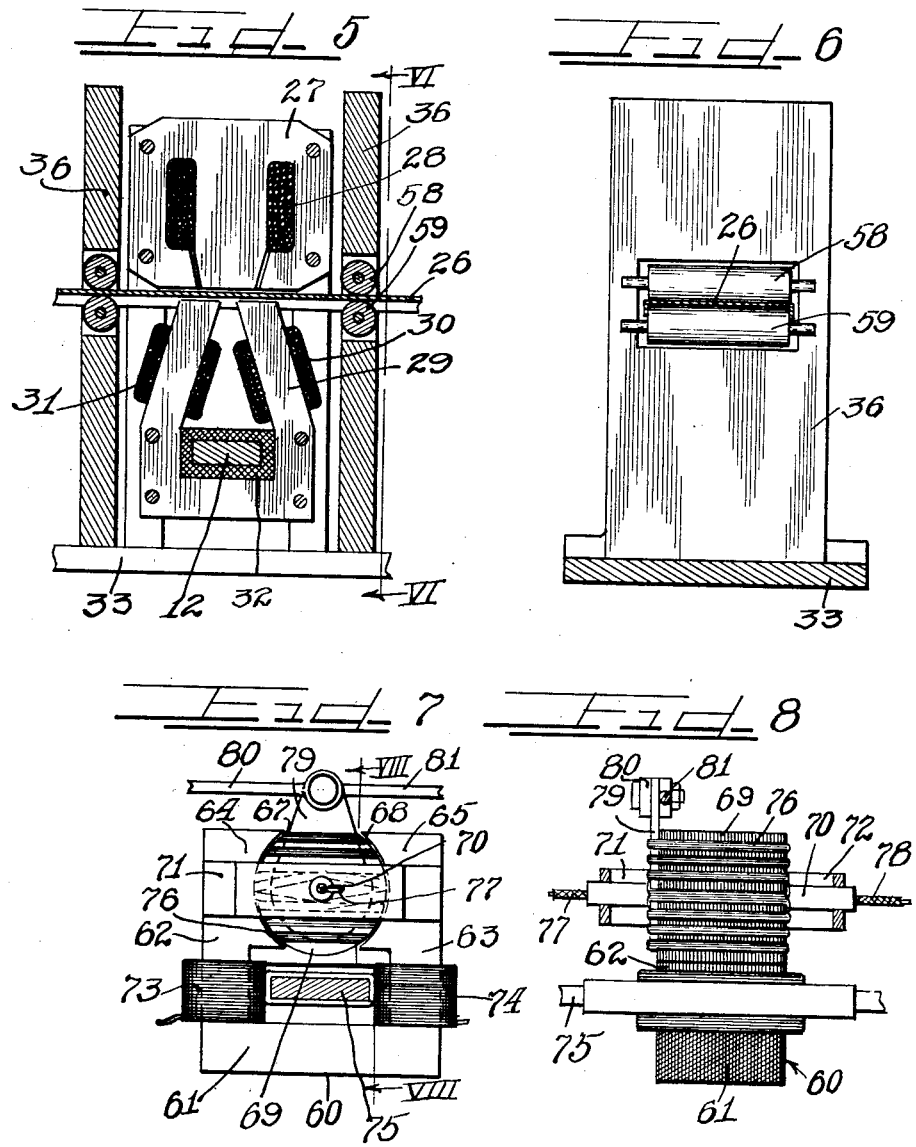

Patented Jan. 4, 1938

2,104,131

UNITED STATES PATENT OFFICE 2,104,131

ALTERNATING CURRENT SYSTEM OF DISTRIBUTION

George A. Matthews, Detroit, Mich., assignor to The Detroit Edison Company, Detroit, Mich., a corporation of New York Application September 25, 1933, Serial No. 690,787

10 Claims. (Cl. 175—294)

The present invention relates in general to improvements in alternating current systems of distribution and is more particularly concerned with improvements in a network system wherein a network of distribution mains may be supplied by a plurality of transformers which derive their primary potentials from the same source or from separate sources and have their secondaries connected in multiple to the network.

Network systems of the aforementioned character have, in general, been provided with means for protecting the system, as a whole, against damage and danger due to a short-circuit in the winding of a supplying transformer or cable fault; and have been so arranged that any supplying transformer can be cut out by opening its primary and secondary supply mains that extend to its primary source and to the network, respectively, by the opening of a single switch on the primary side. Moreover, these systems have been so arranged that, when conditions are again normal, the secondary connections will be restored automatically upon the completion of the primary circuits.

At present, in order to provide for disconnection of the supplying transformer, when the power flowing through the circuit breaker in its secondary connection to the network is reversed, it is the general practice to provide tripping relays of the induction type, that is, relays having a rotatable disc subjected to the influence of current and potential windings. This reverse power affecting the relays has in practice been found either to be high voltage and low current, such as might be produced when the network voltage is higher than the transformer voltage, or low voltage and high current such as might be caused by a short-circuit.

The protective relays have therefore been made extremely delicate and non-rugged and, since their inherent construction results in the development of only a small amount of power, it is necessary to utilize a tripping coil on the circuit breaker, this tripping coil being energized through contacts which are actuated by the relay. Due to the small amount of mechanical power developed by the present types of induction relays, it will be seen that they are impracticable for connecting directly into the power circuit, since the large currents which might flow under abnormal conditions would damage and destroy the accuracy of the relay. For this reason, it has been necessary to utilize expensive current transformers which necessitate additional control wiring, additional contacts and connections; all of which may cause trouble and expense.

It is, therefore, an object of this invention to provide a network system of distribution wherein the protective means are so arranged and constructed as to provide a rugged device having a high degree of sensitiveness on either high or low values of current and potential; protective means which may be connected directly to the circuit without the necessity of using current and potential transformers; and a network protective system wherein the circuit breaker is mechanically tripped by a protecting device operating on the induction principle, thereby obviating the use of a tripping coil and its tripping circuit.

Although this protective device is primarily adapted for network protection, where reverse power and phasing characteristics are desired, the device may be used as an over-current protector for power flowing in a normal or reverse direction.

In accordance with the general features of this invention, there is provided a circuit breaker in the connection of the secondary leads of the transformer to the network, this circuit breaker being of the electrically closed and mechanically tripped type. The tripping of the circuit breaker is accomplished through a mechanical link connected to the moving element of a protective device operating on the induction principle. This protective device comprises cooperative core structures which are disposed on opposite sides of a movable plate of non-magnetic material, such as copper or aluminum. One of these core structures carries a potential coil and the other core structure is magnetized through either a phasing coil thereon or by passing the circuit conductor therethrough in such a manner that when current flows in the conductor, the conductor functions as a single turn current coil and the core becomes magnetized. The magnetic fields which are set up in these two cores cooperate to produce an alternating magnetic field which inductively acts upon the movable plate element to set up eddy currents therein which will react with the magnetic field to move the plate element in a manner well understood in the electrical art. The plate is supported so that it may move longitudinally in opposite directions. It will be observed that the movement of this plate will be rectilinear and is not rotational as in the ordinary and well-known induction relay.

With the above arrangement, it is possible to attain a sufficient amount of force through the movement of this plate to enable, through appropriate linkage, the mechanical tripping of the circuit breaker. Such an arrangement results in a protective system which is very reliable and more positive in operation than the present arrangements. Moreover, by biasing the movement of the plate element of the device by means of adjustable springs, a very flexible arrangement is secured.

As an additional feature, phasing coils are mounted on the current element of the device, these coils being connected across the terminals of the circuit breaker to prevent closing the circuit breaker unless the voltage on the secondary leads of the feeder transformers is slightly higher than the voltage of the network and in proper phase relation, in which case power will be fed into the network.

Other objects and features of this invention will more fully appear from the following detailed description taken in connection with the accompanying drawings which illustrate several embodiments thereof, and in which—

Figure 1 shows diagrammatically a system embodying the present invention, there being a distributing network supplied through a plurality of feeder circuits, each circuit being controlled by means embodying my invention;

Figure 2 is a view in elevation of a protective device constituting a part of my invention;

Figure 3 is a fragmentary plan view of the device as seen from below and showing means for adjusting the same;

Figure 4 is an end view of the device;

Figure 5 is a fragmentary sectional view through one of the units of the device, taken substantially on line V—V of Figure 2 to show the details of a modified mounting for the moving element of the device;

Figure 6 is a view in elevation partly in cross-section to show further details of the modified mounting for the movable element of the device, as viewed substantially on line VI—VI of Fig. 5;

Figure 7 is a view in elevation showing a modified form of the device; and

Figure 8 is a longitudinal section of the device, taken substantially on line VIII—VIII of Figure 7.

As shown on the drawings:

In Figure 1 of the drawings, there is disclosed a system of distribution embodying the principles of my invention. While I have chosen to illustrate my invention in connection with a multi-phase system, it will be readily apparent to those skilled in the art that this invention may be, with equal facility, applied to a single phase system.

Referring more particularly to the drawings, Figure 1 shows a system of distribution embodying the principles of the present invention and comprising the distributing mains 10 of a three-phase star-connected network of the type now in common use. The distributing mains are respectively connected thru feeder circuit conductors 11—11', 12—12' and 13—13' from the secondary of a bank of transformers generally indicated at 14 as having their primaries and secondaries connected delta-star. The neutral N of the secondary connection of the transformers is carried directly to the neutral distribution main. The primary leads 15, 16 and 17 are respectively connected to the high potential mains 18 which are connected to a suitable source of electrical energy. Although it has been deemed necessary to illustrate in detail only one of the feeder circuits to the network, it is to be understood that there may be other feeder circuits feeding into the same distributing mains of the network as diagrammatically illustrated by the conductors N'', 11'', 12'' and 13''. This feeder circuit would either be connected to the high potential mains 18 or may, if desired, be connected to a source of electrical energy independent of that which is connected to the high potential mains 18. Each feeder circuit would be provided with the same devices as have been illustrated in the feeder which is completely shown in Figure 1.

The primary leads of each transformer bank are provided with an overload circuit breaker, as shown at 19 which may be manually or electrically closed as desired. This breaker is provided with an overload trip coil 20 which is connected to the terminals of a current transformer 21 so that, if the current becomes too great as, for instance, on account of a short-circuit, the circuit breaker will be tripped automatically.

The secondary leads of each bank of transformers are connected to the network through a circuit breaker, generally illustrated at 22, which is provided with a closing coil 23, a mechanically tripped latch 24 arranged to hold the circuit breaker in closed position, and a plurality of auxiliary switches 25 arranged to open when the breaker closes and close when the breaker is in open position. The purpose of the auxiliary switches will be subsequently explained in detail. This portion of the circuit breaker 22 just described may be of any well known and common constructions, the only requirement being that it shall have latching means which may be mechanically tripped in contradistinction to the type of breaker which is provided with a tripping coil to be energized through a tripping circuit.

For tripping the latch 24 of the circuit breaker 22, protective means are provided which operate in a manner similar to an induction relay and are arranged to trip the breaker upon the occurrence of predetermined conditions in the secondary leads of the transformers in the feeder circuit and close the breaker 22 when the conditions are normal. The preferred form of protective means comprises a plurality of electromagnets, three in this case, which are generally designated as elements A, B and C and respectively connected and associated with each of the secondary leads from the bank of transformers. A movable element 26, in the form of a plate of non-magnetic material such as copper or aluminum, is positioned within the fields of the electromagnetic elements.

The electro-magnet structure of each stationary element is made up of two sections, one section being mounted on one side of the plate 26 and the other section being mounted on the opposite side of the plate 26. The magnetic circuit of one of these sections comprises a plurality of stacked laminations 27 which are substantially E-shaped and are supported with the unconnected ends adjacent the plate 26. A potential coil 28 for energizing the magnetic circuit is mounted around the middle leg of the core structure.

The other section comprises a stack of substantially U-shaped laminations 29, which are supported with the unconnected ends contiguous the plate 26 and symmetrically disposed relative to the legs of the section on the other side of the plate 26. The core structure which is built up of the laminations 29 is energized by means of phasing coils 30 and 31 which are respectively disposed around each leg of the core structure, these coils being connected in series. In addition to the aforementioned phasing coils of this section, the core structure is energized by carrying the feeder conductor therethrough, this conductor being insulated from the laminations by suitable insulation 32 and functioning as a current coil.

The two sections of the electro-magnetic structure cooperate to set up an alternating magnetic field which acts upon the plate 26 to induce eddy currents therein which react with the alternating field to cause the plate 26 to move in opposite directions depending upon the conditions in the secondary leads of the bank of transformers.

The elements A, B and C are supported upon a common base structure 33 by upper and lower brackets 34 and 35, the elements being in alignment and separated from each other by metallic barriers 36—36 of copper which are disposed between the outermost elements and the central element to form magnetic shields between the elements. These barriers are apertured to receive therethrough, the plate member 26.

At each end of the device as thus assembled, the brackets 35 are each provided with a pair of horizontally spaced and outwardly projecting arms 37 and 38 which pivotally support a bracket generally indicated at 39 and comprising a pair of spaced arms 40 and 41 which extend outwardly from the pivotal support thereof and define on one side of the pivotal support a counterbalance 42 and on the other side opposite the counterbalance a support for the ends of a pivot member 43 carried by and secured to plate 26. With this arrangement, the plate 26 may be shifted longitudinally relative to the elements A, B and C, and due to the counterbalancing of the brackets 39, the device may be mounted in any position.

In order that the mechanical movement of the plate 26 may be taken advantage of for mechanically tripping the latch 24 of the circuit breaker, a double bell crank 44 is pivotally mounted on an end bracket 35 adjacent one of the brackets 39. This bell crank is provided with aligned arms 45 and 46 which extend in opposite directions from the pivot of the bell crank. Extending at right angles to these arms is a third arm 47 which is pivotally connected at its outer end to a rod 48, the movement of this rod operating to trip the latch 24 of the circuit breaker 22. The outer end of arm 46 has threaded thereon a stud carrying a U-shaped restraining member 49 which cooperates with a roller 57' on arm 41 to determine the range of movement of plate 26 within which no control action is obtained. As shown in Fig. 2, the restraining member or yoke 49 is yieldingly urged toward the right by a relatively weak spring 50 that is connected between the eyebolt 50' on bracket 39 and a rod 51 that slides in a bracket 52 on a baffle member 36 and may be fixed to the bracket 52 by a set screw 53 when the rod is adjusted to establish the desired tension in the spring 50. A spring 54 is secured to the free end of arm 45 to urge the bell crank and the restraining member 49 in the opposite direction by a force which is determined by the adjustment of the spring anchor rod 55 in a baffle member 36, the rod being fixed in the desired position by a set screw 56.

It will be seen from Fig. 2 that movement of the plate 26 towards the left, i. e. in the direction of arrow 103, is restrained by the tension in spring 50 when the roller 57' on arm 41 engages the left side of the restraining member 49.

Spring 50 is relatively weak and thus the plate 26 may move quite freely under the influence of small values of current in the phasing coils 30 and 31. When moving in the direction of the arrow 103, under the influence of current in the phasing coils, the plate 26 closes the switch 99, as will be more fully described later.

When the arm 41, and the roller 57', are moved beyond the limit set by the restraining member 49, in the direction of the arrow 104, bell crank 46 is rotated against the action of spring 54, which, through the arm 47, moves the rod 48, and the latch 24, to the tripped position.

It will therefore be apparent that, by adjusting spring 50, it is possible to calibrate the amount of phasing current required in the coils 30 and 31 to close contacts 99, and by adjusting spring 54, the amount of reverse power required to actuate the trip latch 24 may be adjusted.

Referring further to Figure 2, the plate 26 of the protective device may be provided with a series of graduations such as shown at 56' which are cooperatively associated with a stationary point or surface such as the outer face 34' of one of the brackets 34. These graduations may carry any suitable indicia and may be utilized to indicate as the plate 26 is moved in one direction or the other, the direction and the amount of power flowing in the feeder circuit.

In Figures 5 and 6, I have illustrated a modified form of mounting for the longitudinally moving plate member 26. Instead of depending upon the pivot member 43 at each end of the plate 26, as shown in Figure 4, for maintaining the plate 26 in proper position between the sections of the electro-magnets, each baffle plate 36 is provided with a pair of rollers 58 and 59 which are supported in the baffle plate at their ends for rotational movement. These rollers are in parallel relation and are spaced apart sufficiently to enable the plate 26 to extend therebetween and be engaged on each side by the rollers. The lateral edges of the plate 26 are deflected in the same direction to define right angularly disposed flanges for slidingly engaging the ends of one of the rollers. With this arrangement, the plate 26 is maintained in proper position between the sections of the electro-magnet and is also prevented from shifting laterally by means of the lateral flanges just described.

Figures 7 and 8 illustrate a modified form of protective means, this modified form being operated on the dynamometer principle rather than inductive principle as embodied in the preferred form of the invention. In the modified form of the invention, each electro-magnetic unit comprises a stator 60 which is built up of a plurality of laminations 61 which are substantially U-shaped to provide spaced legs 62 and 63. The outer ends of these legs are extended toward each other to form magnetic poles 64 and 65 having confronting arcuate pole faces 67 and 68. Disposed between the pole faces 67 and 68 is a laminated rotor 69 having its outer surface spaced from the pole faces. This rotor is provided with a shaft 70 having its ends respectively supported in suitable brackets 71 and 72 which are secured to the opposite sides of the stator 60.

The stator is magnetized by phasing coils 73 and 74 which are respectively disposed around the legs 62 and 63 of the stator, these coils being connected in series. The stator may also be magnetized by the flow of current through the conductors of the circuit being protected, each conductor being carried through the stator opening as shown at 75. Of course, it is desirable to suitably insulate this conductor from the stator laminations and the coils 73 and 74.

The rotor 69 carries a potential coil 76, the ends 77 and 78 being brought out through the ends of the shaft 70.

It will be observed that the potential coil is so disposed on the rotor that the plane of the individual turn is parallel in the normal position of the rotor to the magnetic field flux passing between the pole faces 67 and 68. The purpose of arranging the turns of the potential winding in this manner is to prevent potential being induced in the rotor winding. The rotor is provided with an arm 79 which is connected through links 80 and 81 to other electro-magnetic units so that the combined action of the units or elements may be transmitted to the latch 24 of the circuit breaker 22. It will be apparent to those skilled in the art that when the stator is energized from a source of current and the rotor winding is energized from a potential source, the rotor will move in one direction and that when the potential source and current source are reversed relative to each other, the rotor will be moved in the opposite direction.

Referring to Figure 1, the potential coil 28 of each element is connected to one phase of the circuit being protected. For example, the potential coil of element A is connected through conductors 81 and 82 to the secondary leads 11 and 13 of the transformers, the potential coil of element B by conductors 83 and 84 to secondary leads 11 and 12, and the potential coil of element C through conductors 85 and 86 to secondary leads 12 and 13.

The phasing coils of each electro-magnetic element are connected across the contact terminals of the switch 22 in each of the secondary leads of the transformers. For example, one terminal of the current coil 30 is connected through conductor 87 to that contact terminal of circuit breaker 22 which is connected to the conductor 11' of the transformer secondary connections to the network. The other terminal of coil 30 is connected in series with coil 31 through conductor 88 and the other terminal of the coil 31 is connected to conductor 89, through one of the auxiliary switches 25 of the circuit breaker 22, conductor 90 to a lamp 91 and thence by conductor 92 to the terminal of the circuit breaker 22 which is connected to the conductor 11 of the transformer secondary connections. The phasing coils of the elements B and C are respectively connected in like manner across the contact terminals in secondary leads 12 and 13.

The control circuit for the closing coil 23 of the circuit breaker 22 is as follows: One terminal of the closing coil 23 is connected through conductor 93 to the conductor 13 on the feed side of the circuit breaker. The other side of the closing coil 23 is connected by conductor 94 to one contact of a normally open relay 95, and thence from the other contact of this relay through fuse 101, conductor 102 to conductor 12. The control circuit for the actuating coil 96 of the relay 95 is from conductor 12 through fuse 101, to one terminal of coil 96, from the other terminal of coil 96 to one of the auxiliary switches 25 on the circuit breaker 22, conductor 98, through the contacts of an auxiliary switch 99, which is actuated in response to the movement of the plate 26, and thence through conductor 100 to the conductor 11 connected to the transformer bank. With this arrangement, when the relay 95 closes, the coil 23 is directly connected across one phase of the feeder circuit.

Referring to Figure 1, the operation of the system embodying my invention will now be explained.

Let it first be assumed that the network 10 is energized from some source, such as the feeder circuit composed of conductors 11", 12", 13", and N", that the high potential distribution line 18 is energized, and that circuit breakers 19 and 22 are in their open positions. Under such conditions, the transformer bank and the potential coils of elements A, B and C are deenergized and the phasing coils are energized from the network through the secondary windings and the connection N to the neutral wire of the network, but the electro-magnetic forces acting on the plate 26 are insufficient to cause its movement. The spring 50 should be previously adjusted so as to hold the auxiliary switch 99 in open position. If switch 19 is now closed, the transformer bank 14 is energized from the mains 18. The secondary voltage of the transformers is thereby applied to the potential coils of the elements A, B and C and the phasing coils of each element will be energized. If the voltage and phase relation of the transformer bank is in proper relation to that of the network, the plate 26 will move to close switch 99. For any other transformer and phase relation plate 26 will move to hold switch 99 open. For example, in element A current will flow through the phasing coils 30 and 31 over the following circuit: From secondary lead 11, conductor 92, through lamp 91, conductor 90, an auxiliary switch 25, conductor 89 to one terminal of coil 31, from the other terminal of coil 31 through conductor 88, through coil 30 and conductor 87 to conductor 11' which is connected to the network.

The current, phasing and potential coils of each element produce magnetic fields passing through the plate 26 which combine with induced eddy currents in the plate 26 in a manner well known to the art to produce a proportional and directional force which will be dependent upon the relation of the current in coils 30 and 31 to the current in coil 28. This action will cause the plate 26 to move in the direction of the arrow 103 against the force of spring 50 and close auxiliary switch 99 only when the voltage and phase relation on opposite sides of the circuit breaker 22 are such as to cause power to flow into the network.

Since the auxiliary switches 25 on the circuit breaker 22 are closed when the breaker is open, the closing of auxiliary switch 99 causes the energization of coil 96 of the relay 95. The coil 96 will be energized through the following circuit: from secondary lead 11 of the transformer bank, through conductor 100, through auxiliary switch 99, conductor 98, auxiliary switch 25, conductor 97, through coil 96 to one contact of relay 95, and thence through fuse 101 and conductor 102 to secondary lead 12 of the transformer bank. The relay 95 being energized will close its contacts and energize the closing coil 23 of the circuit breaker 22 through the following circuit: from secondary lead 12 of the transformer bank, through conductor 102, fuse 101, the contacts of relays 95, through conductor 94, coil 23, and thence through conductor 93 to secondary lead 13 of the transformer bank. The closing coil 23 being energized, the breaker 22 will close its contacts and be latched in closed position by latch 24. As soon as the contacts of the circuit breaker 22 are closed, the auxiliary contacts 25 are opened and the relay coil 96 deenergized. The auxiliary contacts 25 also operate to open the circuit through which the phasing coils 30 and 31 of each of the elements A, B and C are energized. If power still continues to flow towards the network, the plate 26 will be forced with greater effort in the direction of arrow 103, since the feeder conductors 11, 12 and 13 respectively pass through the sections 29 of the electro-magnetic elements A, B and C.

If the power flow should now be reversed, that is, flow from the network to the transformers, due to opening the circuit breaker 19, a fault in the secondary lead or short-circuit in the transformer or its connections or for any other reason, the plate 26 will be moved in the direction of arrow 104 against the force of spring 54, thereby moving the rod 48 in such direction as to release the latch 24 and trip the circuit breaker 22 and open its contacts. After the circuit breaker 22 opens its contacts, current will still continue to flow from the network to the transformer through the phasing coils 30 and 31 of each of the electro-magnetic elements and will continue to hold the plate 26 in the trip position.

As soon as the trouble is remedied and the circuit breaker 19 is closed, the electromagnetic elements A, B and C will be again energized and the circuit breaker 22 will again be closed automatically, as previously described, when proper phase conditions exist in the supply circuit and the network.

From the foregoing description, it will be apparent that the present invention provides a network system wherein the protective means are of rugged construction and yet operate in such a manner as to provide a high degree of sensitiveness; which may be connected directly to the circuit which is to be protected without the necessity of using expensive auxiliary equipment, such as current and potential transformers; and which operates to mechanically trip the circuit breaker with which it is associated, thereby making it unnecessary to use a tripping coil and its tripping circuit, thus simplifying the system to thereby obviate, to a large extent, the possibilities of failure therein.

Now, it is of course to be understood that, although I have described in detail several embodiments of my invention, the invention is not to be thus limited but only insofar as defined by the scope and spirit of the appended claims.

I claim as my invention:

1. A protective device for a three-phase circuit comprising a three-phase circuit breaker, a latch for preventing movement of the circuit breaker in one direction, and tripping mechanism for actuating said latch; said mechanism including a plurality of units to individually produce a shifting magnetic field, each unit being connected to one phase of said circuit for potential and current energization, a member common to all of said units, means supporting said member for rectilinear movement, said member being subjected to the combined influence of the magnetic fields of all the units, and a mechanical linkage connecting said member and said latch.

2. A protective device for a multiphase circuit comprising a multiple phase circuit breaker, a latch for preventing movement of the circuit breaker in one direction, and tripping mechanism for actuating the latch; said mechanism comprising a plurality of units to individually produce a shifting magnetic field, each being connected to one phase of said circuit for potential and current energization, a member common to all of said units, means supporting said member for rectilinear movement, said member being subjected to the combined influence of the magnetic fields of all the units, means controlled by said member for actuating said latch, and metallic shields disposed between said units to prevent the magnetic fields of the units from interfering with each other.

3. In a protective device for a multiphase circuit the combination with a circuit breaker, and a latch normally retaining said circuit breaker in closed position, of means for tripping said latch; said means including an elongated plate of non-magnetic material, means supporting said plate for rectilinear movement, means actuated mechanically by an abnormal movement of said plate to trip said latch, and means for establishing eddy currents in said plate to move the same in accordance with voltage and current conditions in said circuit, said last means including for each phase a coil to set up a magnetic field when energized by the potential of that phase and a second coil energized by the current in that phase to produce another magnetic field.

4. A protective device for an electrical circuit comprising a core structure adapted to extend around a conductor of said circuit and having aligned poles with their pole faces spaced apart, a current coil to set up a magnetic field between said poles, this field being augmented by the field set up by current flowing in said conductor, a rotor disposed between said poles, a potential coil carried by said rotor, said coils being energizable from said circuit, the direction of rotation of said rotor being determined by the direction in which power flows in said circuit.

5. A protective device for an electrical circuit comprising a core structure adapted to extend around a conductor of said circuit and having aligned poles with their pole faces spaced apart, a current coil to set up a magnetic field between said poles, this field being augmented by the field set up by current flowing in said conductor, a rotor disposed between said poles, a potential coil carried by said rotor, said coils being energizable from said circuit, the direction of rotation of said rotor being determined by the direction in which power flows in said circuit, said potential coil being disposed with the planes of the coil turns substantially parallel to the path of the flux between the poles.

6. In an alternating current system, the combination with a feeder circuit including a step-down transformer, a network and a line connecting said transformer to said network through a circuit breaker, of tripping mechanism for opening said circuit breaker, said tripping mechanism including a latch, a trip member, and means for actuating said trip member, said means including an open core of magnetic material surrounding said line.

7. The invention as claimed in claim 6, in combination with means for automatically reclosing said circuit breaker, said means including phasing coils on said core, circuit elements including a normally open switch connecting said phasing coils between the transformer and the network, and means actuated by said trip member to close said switch when the circuit breaker is open.

8. In an alternating current network distribution system, the combination with a feeder circuit including a step-down transformer, a network and a line connecting the secondary of said transformer to said network through a circuit breaker, spring means tending to open said circuit breaker, and a latch for normally retaining said breaker in closed position, of a trip member for actuating said latch, means including a core of magnetic material surrounding said line for actuating said latch, a phase winding on said core for restoring said trip member to normal position when the voltage of said network is in phase with the transformer secondary voltage, and a circuit for said phase winding including a switch operative to closed position when said circuit breaker moves to open position.

9. In a three-phase network distribution system, the combination with a multiphase feeder circuit, a multiphase network system, a line connecting each phase of the feeder circuit to the corresponding phase of said network, a circuit breaker for simultaneously controlling the several lines, means tending to open said circuit breaker, a latch normally retaining said circuit breaker in closed position, and a solenoid for reclosing said circuit breaker, of a trip member operative from a normal position to actuate said latch, means responsive to an abnormal condition for actuating said trip member to displaced position to actuate said latch, means operative when said circuit breaker is open for returning said trip member to normal position when said feeder circuit voltage is in phase with the network voltage, a circuit for said reclosing solenoid connected across two of said lines and including a switch, a relay for actuating said switch, and a circuit for energizing said relay to close said switch, said last circuit including back contacts on said circuit breaker and a switch operable to closed position when said trip member is in normal position.

10. In a multiphase alternating current network distribution system, the combination with a three-phase network, a three-phase feeder circuit, and a circuit breaker connected between said network and said feeder circuit, of spring means tending to open said circuit breaker, a latch for normally retaining said circuit breaker in closed position, an elongated trip member of non-magnetic material for actuating said latch, and means for controlling said trip member; said means comprising voltage responsive electromagnetic means permanently connected across the respective phases of said feeder circuit, and electromagnetic means individual to each phase and cooperating with said first electromagnetic means to establish eddy currents in said elongated trip member; said second electromagnetic means including means operative when said circuit breaker is closed to create eddy currents in said trip member corresponding to current flow between said feeder circuit and said network, and operative upon an opening of said circuit breaker to establish in said trip member eddy currents corresponding to the voltages across said circuit breaker.

GEORGE A. MATTHEWS.